Feb. 20, 1940.   O. J. GULBRANDSEN   2,190,984
FISHING ROD AND REEL ATTACHMENT
Filed July 14, 1939   2 Sheets-Sheet 2
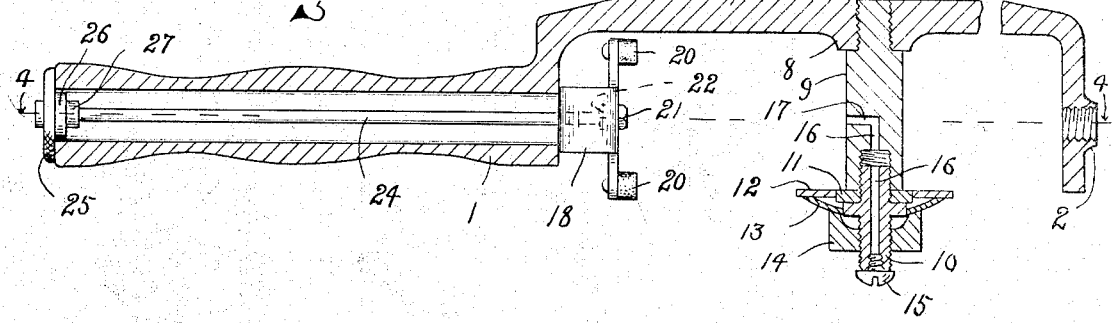
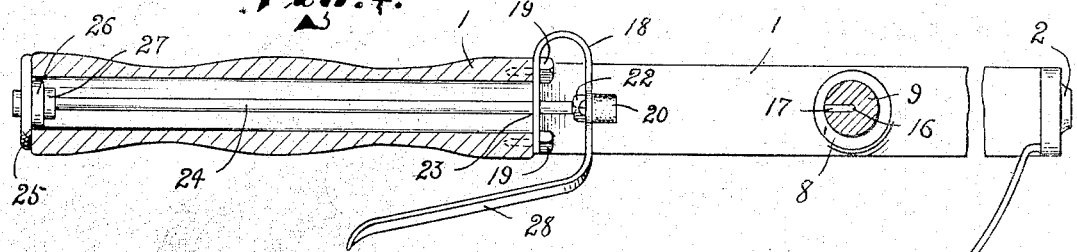
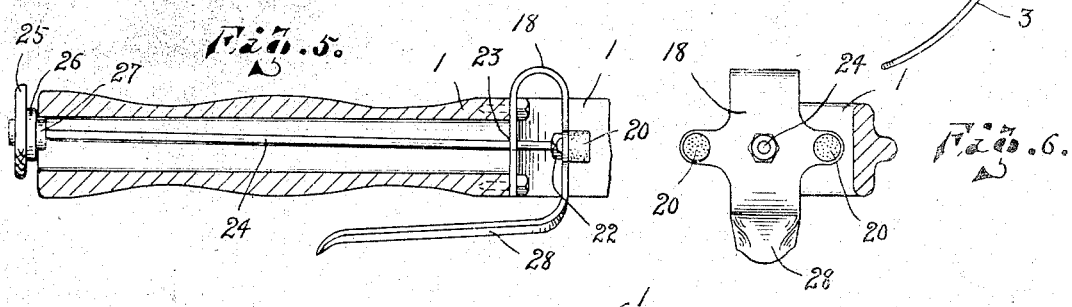
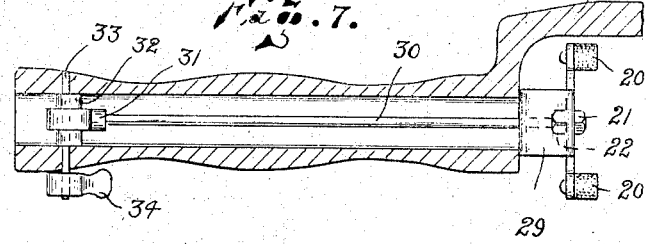
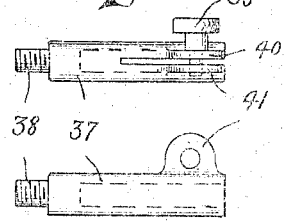
INVENTOR.
Oscar J. Gulbrandsen
BY Geo Stevens
ATTORNEY.

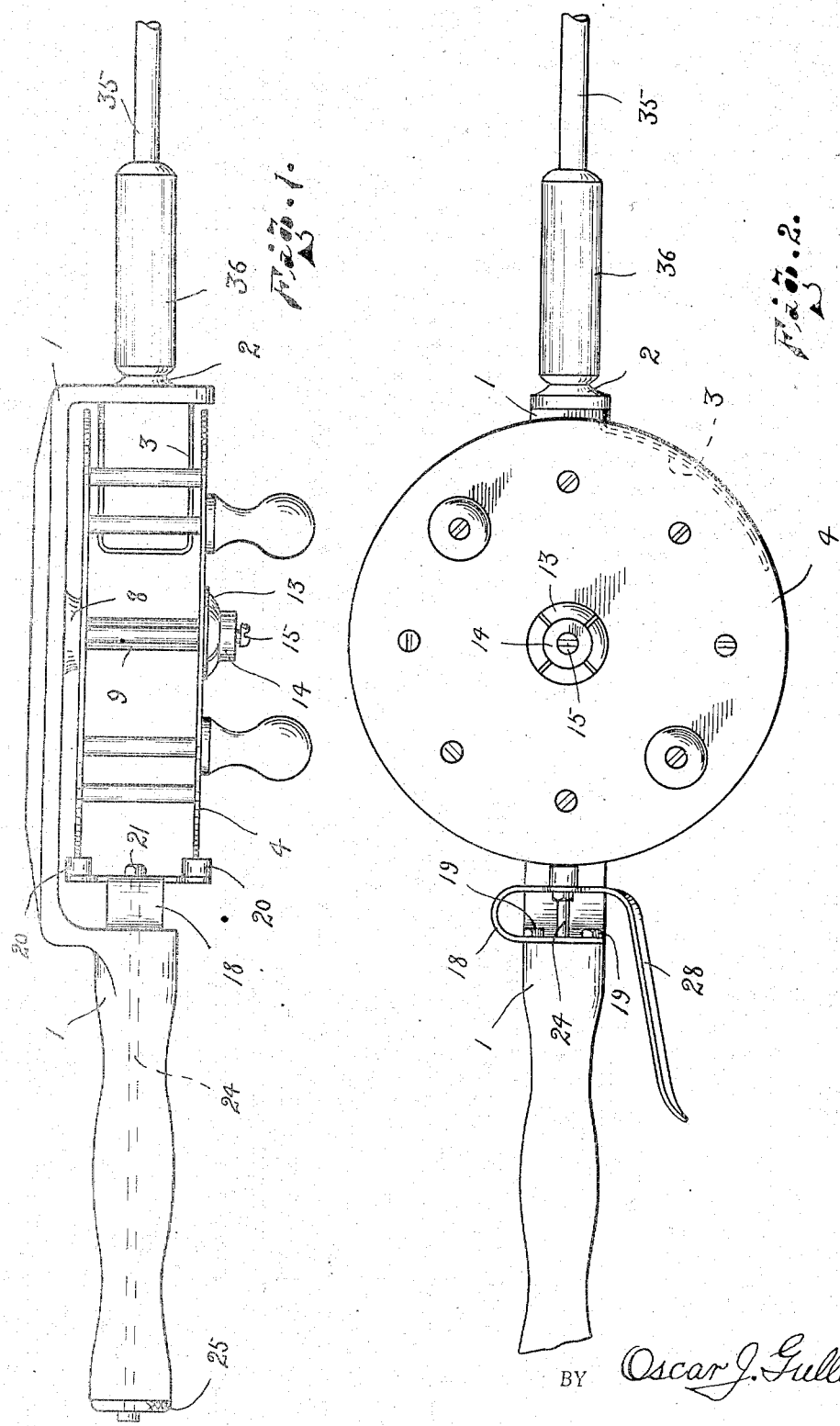

Patented Feb. 20, 1940

2,190,984

UNITED STATES PATENT OFFICE 2,190,984

FISHING ROD AND REEL ATTACHMENT

Oscar J. Gulbrandsen, Duluth, Minn.

Application July 14, 1939, Serial No. 284,533

3 Claims. (Cl. 43—20)

My invention relates to a combined fishing rod and reel and has particular reference to a brake mechanism therefor which may be operated by the angler to prevent "overrunning" or too free unwinding of the line, and to permit perfect control of the line at all times.

Another object of the invention is to provide such a device in the simplest and most economical manner possible.

Further objects and advantages of the invention will appear in the following description thereof.

Referring now to the accompanying drawings, forming part of this application, and wherein like reference characters indicate like parts:

Figure 1 is a top plan view of a combined fishing rod and reel incorporating the invention.

Figure 2 is a side elevation of the same.

Figure 3 is a longitudinal section of Figure 1 omitting the reel and rod.

Figure 4 is a section on the line 4—4 of Figure 3, showing portions in elevation.

Figure 5 is a section of the handle portion only showing the hand brake released.

Figure 6 is a front elevation of Figure 5.

Figure 7 is a longitudinal section of the handle showing a modified form of brake release.

Figure 8 is a similar view taken at right angles to Figure 7.

Figures 9 and 10 are top and side elevations of an adapter for using conventional steel pole.

In the accompanying drawings, the numeral 1 designates the frame and handle of the device. At the forward end of the frame, in line with the center line of the handle is a boss 2 which is drilled and tapped to receive either the inner end of the fishing rod 36, or the adapter 37. Secured to the forward end of the frame is the guide 3 which consists of a U-shaped loop of wire, bent to conform to the curvature of the outer edge of the reel and of such width as to fit closely between the side plates of the spool 4 without touching the same. This guide is for the purpose of leading the line into the spool.

The spool 4 consists of two circular side plates attached to spacer bars 5 and hub 6, and is provided with a pair of handles 7.

Near the center of the offset portion of the frame 1 is a boss 8 to which is secured the inner end of the axle 9 upon which the spool rotates. At the outer end of the axle 9 is an adjustable drag acting on spool 4 which prevents the line from "overrunning", and the details of this drag are shown in Figure 3. The outer end of the axle 9 is drilled and tapped to receive the inner end of stud 10 which is made with a square shoulder located near the middle of its length which clamps the washer 11 against the end of shaft 9. The washer 11 is hexagonal in shape and serves to keep the spool 4 in place on the axle 9 and also to prevent friction disc 12 from rotating. This disc 12 is made of any suitable material so as to drag against the spool 4 without undue wear, and the hole in the center of the disc is hexagonal in shape to fit the washer 11.

The cupped washer 13 is made of resilient material such as phosphor bronze, and has a square hole in the center to fit the square shoulder on the stud 10, and the outer edge of this cupped washer 13 presses against the friction disc 12. The knurled nut 14 is threaded to fit stud 10 and has a ridge around its inner edge by which pressure can be exerted against the cupped washer 13 and friction disc 12. The disc 12 is thus pressed against the side plate of spool 4, causing a drag which can be adjusted by nut 14 to any desired value.

Holes 16 and 17 are drilled in the shaft 9 so as to intersect each other, and by this means the reel axle can be oiled without removing the spool. The screw 15 serves to close the outer end of oil hole 16 against dirt and also to prevent the adjusting nut 14 from backing off.

Attached to the handle 1 is a spring operated brake which may be locked in the "on" or "off" position as shown. The flat spring 18 is formed as indicated in the drawing of a resilient material such as phosphor bronze and is attached to the forward end of the handle by means of screws 19 or some similar means. To the forward side of the U-shaped portion of the spring are attached two friction blocks 20 which are so located that the pressure of the spring 19 forces them against the edges of the side plates of spool 4. The intensity of this spring pressure can be adjusted from any value between zero and maximum by adjusting the nuts 21 and 22 on rod 24. The rod 24 passes through a hole 23 in the spring 18 and thence back through the hollow handle 1 to the disc 25 to which it is securely attached. Disc 25 is made with two shoulders indicated at 26 and 27. The free end of the spring 18 is bent and extended backwardly to form a trigger 28. By pressing this trigger 28 toward the handle 1 as shown in Figure 5 the spring 18 bends and causes friction blocks 20 to disengage their contact with the spool 4 and let the spool run free. When the trigger 28 is pressed toward the handle 1 the end of the rod 24 attached to the spring 18 by the nuts 21 and 22 is deflected downwardly (see Figs. 4 and 5) and also toward the rear of the handle. Since the rod 24 fits closely in the hole 23 this deflection causes the disc 25 to move into position as shown in Figure 5. The shoulder 26 then bears against the end of the handle 1, thus holding the brake in the "off" position. To reset the brake, the disc 25 is pressed laterally until the shoulder 26 slips into the hole of handle 1. The shoulder 27, of course, limits the distance that the disc 25 can move away from center-line of handle.

Figures 7 and 8 illustrate an alternative method of operating the hand brake. The flat spring 29 is the same as spring 18 shown in Figures 4, 5 and 6 except that the trigger portion 28 is omitted. Rod 30 is attached to spring 29 by means of adjusting nuts 21 and 22. The rear end of the rod 30 is attached to the eye 31 which is made to have a sliding fit on the eccentric pin 32. Shaft 33 is firmly attached to the eccentric pin 32 and to lever 34, and turns in bearings formed by drilling holes through the handle 1. By rotating the lever 34 and eccentric pin 32 through an angle of 180° the brake blocks 20 can be pulled away from the spool 4 and the brake thereby released.

The detachable rod 35 is of course equipped with standard line guides at the forward end and middle. Its inner end is threaded to fit into the tapered hole of the boss 2, and an enlarged hub 36 provided with a knurled surface is attached to the rear portion of the rod, which serves as a handle with which to steady the rod. Hub 36 also serves as a stop when the rod 36 is screwed into boss 2. It is adjusted so that the guides on the rod are in the proper position relative to the reel when rod 35 is screwed tightly into boss 2.

In Figures 9 and 10 I have shown an adapter 37 for using a standard steel rod tip instead of the rod 35. The threaded end 38 fits tapped hole in boss 2. The opposite end of adapter 37 is drilled to fit a standard rod tip and one side of this hole is slotted. Ears 40 and 41 are located on opposite sides of the slot, and a thumb nut 39 passes through a plain hole in ear 40 and screws into a threaded hole in ear 41. By tightening the thumb nut the pole tip can be securely clamped into position.

Having thus described my invention, what I claim and desire to secure by Letters Patent, is:

1. In a device of the class described, the combination with a fishing rod handle, a reel frame and reel rotatably secured in said frame, of a brake for said reel comprising a strip of spring material attached at one end to an end of said handle and bent upon itself between said handle end and the reel and adapted to bear against said reel and bent to extend along said handle whereby hand pressure may be applied thereto to release the brake from said reel, and means for holding said brake released.

2. The combination set forth in claim 1, said means extending through said handle.

3. The combination set forth in claim 1, said means comprising a rod attached to said spring material and extending through said handle and engaging the end of said handle when hand pressure is applied to release the brake.

OSCAR J. GULBRANDSEN.